United States Patent
Bratkovski

(10) Patent No.: US 7,187,491 B1
(45) Date of Patent: Mar. 6, 2007

(54) BEAM STEERING USING PHOTONIC CRYSTAL

(75) Inventor: Alexandre Bratkovski, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/339,144

(22) Filed: Jan. 25, 2006

(51) Int. Cl.
*G02F 1/00* (2006.01)

(52) U.S. Cl. .................. 359/321; 359/298; 359/322

(58) Field of Classification Search ............... 359/321, 359/322, 323, 238; 385/4, 5, 16, 39, 47
See application file for complete search history.

(56) References Cited

U.S. PATENT DOCUMENTS

| | | |
|---|---|---|
| 6,668,109 B2 | 12/2003 | Nahum et al. |
| 6,914,715 B2 | 7/2005 | Nakazawa et al. |
| 6,961,501 B2 | 11/2005 | Matsuura et al. |
| 2002/0017834 A1 | 2/2002 | MacDonald |
| 2003/0227415 A1 | 12/2003 | Joannopoulos et al. |
| 2005/0117866 A1 | 6/2005 | Park et al. |
| 2006/0051009 A1* | 3/2006 | Seki et al. ............. 385/5 |

FOREIGN PATENT DOCUMENTS

WO   WO 2004/027479   4/2004

OTHER PUBLICATIONS

Baba, T., "Photonic Crystal Light Deflection Devices Using the Superprism Effect," IEEE J. Quantum Electronics, vol. 38, No. 7 (Jul. 2002).
Park, W., et al., "Mechanically tunable photonic crystal structure," App. Phys. Lett., vol. 85, No. 21, pp. 4845-4847 (Nov. 22, 2004).
Scrymgeour, D., et. al., "Electro-optic control of the superprism effect in photonic crystals," App. Phys. Lett., vol. 82, No. 19, pp. 3176-3178 (May 12, 2003).
Luo, C., et al., "Superprism effect based on phase velocities," Optics Letters, vol. 29, No. 7, pp. 745-747 (Apr. 1, 2004).
Tandon, S.N., et al., "The superprism effect using large area 2D-periodic photonic crystal slabs," Photonics & Nanostructures—Fundamentals & Applications 3, pp. 10-18 (2005).

* cited by examiner

Primary Examiner—Timothy Thompson

(57) ABSTRACT

A device for deflecting an incident radiation beam through a steering angle to produce a deflected radiation beam is described. The device comprises a photonic crystal receiving the incident radiation beam at a dynamically controlled incidence angle. The photonic crystal is configured to negatively refract the incident radiation beam such that relatively large controlled variations of the steering angle are provided by relatively small controlled variations of the incidence angle.

18 Claims, 4 Drawing Sheets

BEAM STEERING USING PHOTONIC CRYSTAL

FIELD

This patent specification relates generally to radiation beam steering devices as may be useful, for example, in switching and modulation applications.

BACKGROUND

Systems that controllably deflect incident electromagnetic radiation represent fundamental components of many modern technological devices including, but not limited to, optical switches, optical modulators, and other optical communications devices. Notably, it is to be appreciated that although one or more of the embodiments herein is presented in the context of optical communications frequencies, the present teachings are applicable across a broad spectrum of radiation frequencies ranging from microwave frequencies to x-ray radiation frequencies.

Optical switching devices based on microelectromechanical systems (MEMS) technology have been proposed in which the orientation of one or more micro-mirrors is controlled to achieve redirection of an incident optical beam toward different, spatially separated output ports. Advances in lightwave circuit fabrication methods have yielded increased performance and spatial compactness in such MEMS-based optical switching devices. However, issues remain that may confound further attempts to improve their performance and/or spatial compactness.

By way of example, because there is a relatively modest relationship between the angular orientation of a planar micro-mirror and the beam redirection angle provided by that micro-mirror, it is often necessary to position the respective output ports a substantial distance away from the micro-mirror to achieve sufficient spatial divergence of the resultant deflected beams. Although at least partially remedied by various foldover arrangements, limitations on achievable device compactness are nevertheless presented. It would be desirable to provide for controllable light deflection over a broader range of angles for a given angular actuation of a light-deflecting element. It would be further desirable to provide for controllable deflection of an incident optical beam promoting improvements in one or more of switching speed, modulation speed, scalability, and integrability with other planar lightwave devices. Other issues remain as would be apparent to one skilled in the art upon reading the present disclosure.

SUMMARY

In accordance with an embodiment, a device for deflecting an incident radiation beam through a steering angle to produce a deflected radiation beam is provided, comprising a photonic crystal receiving the incident radiation beam at a dynamically controlled incidence angle. The photonic crystal is configured to negatively refract the incident radiation beam such that relatively large controlled variations of the steering angle are provided by relatively small controlled variations of the incidence angle.

Also provided is a method for controlling an incident radiation beam, comprising placing a photonic crystal in the path of the incident radiation beam, the photonic crystal being configured for negative refraction at a frequency of the incident radiation beam. The photonic crystal deflects the incident radiation beam through a steering angle to produce a deflected radiation beam. An incidence angle between the incident radiation beam and the photonic crystal is dynamically controlled, wherein relatively large controlled variations of the steering angle are provided by relatively small controlled variations of the incidence angle.

Also provided is an apparatus for deflecting an incident radiation beam through a steering angle to produce a deflected radiation beam, comprising a photonic crystal receiving the incident radiation beam at an incidence angle and being configured for negative refraction at a frequency of the incident radiation beam. The apparatus further comprises means for dynamically controlling the incidence angle. Relatively large controlled variations of the steering angle are provided by relatively small controlled variations of the incidence angle.

DETAILED DESCRIPTION

Figure 1:
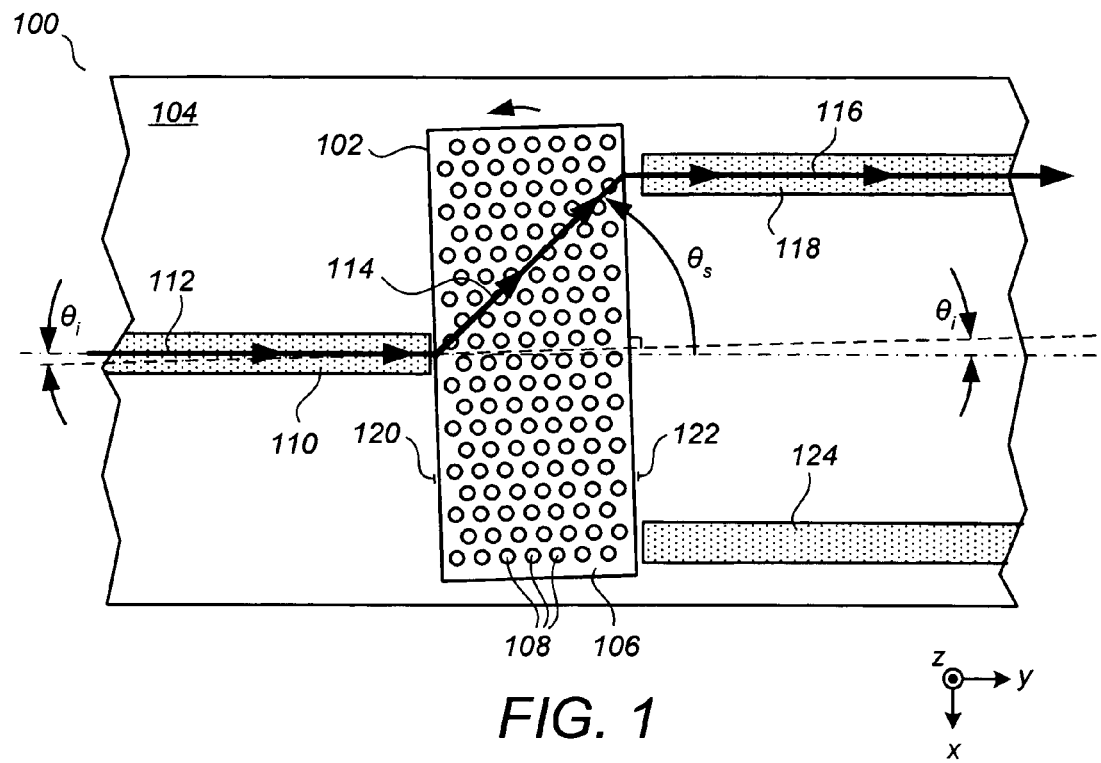
FIG. 1 illustrates a top view of an optical device according to an embodiment in a first configuration.

FIG. 1 illustrates a top view of an optical device 100 according to an embodiment, comprising a photonic crystal 102 rotatably mounted on a substrate 104. The photonic crystal 102 is a periodically repeating structure comprising a first material 106 having a first dielectric constant into which patterns of a second material 108 having a second dielectric constant are formed. Optical device 100 further comprises an input waveguide 110, a first output waveguide 118, and a second output waveguide 124. The photonic crystal 102 is oriented at an incidence angle $\theta_i$ relative to the input waveguide 110 and, therefore, is oriented at the incidence angle $\theta_i$ relative to an incident light beam 112 propagating therealong.

In accordance with an embodiment, the photonic crystal 102 is configured to be negatively refractive at a frequency of the incident light beam 112 such that the photonic crystal 102, in accordance with a superprism effect, deflects the incident light beam 112 through a steering angle $\theta_s$ to produce a deflected light beam 114, the steering angle $\theta_s$ being relatively large compared to the incidence angle $\theta_i$. As illustrated in FIG. 1, the deflected light beam 114 has a greatly altered trajectory, even where the incidence angle $\theta_i$ is relatively small. For the embodiment of FIG. 1, the photonic crystal 102 has an output side 122 that is parallel to an input side 120. An output beam 116 is collected by the first output waveguide 118 running substantially parallel to the input waveguide 110 and positioned at the lateral (i.e., x-axis) location at which the deflected beam 114 intersects the output side 122.

Figure 2:
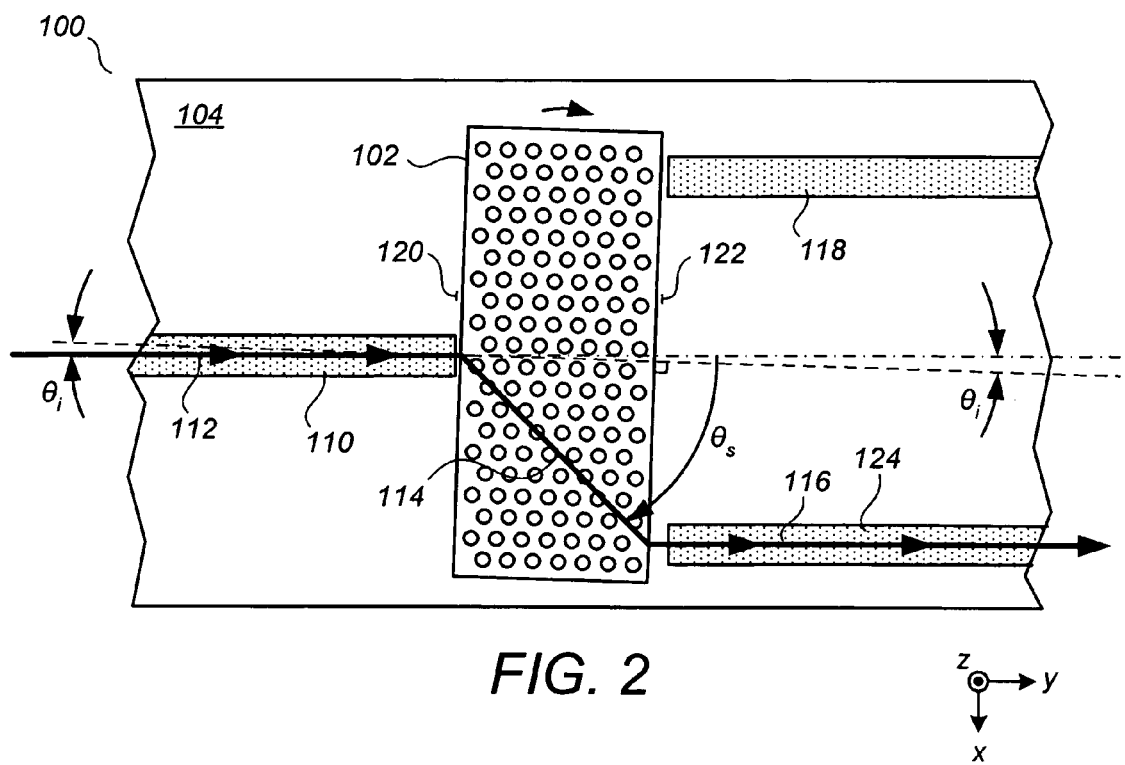
FIG. 2 illustrates a top view of the optical device of FIG. 1 in a second configuration.

FIG. 2 illustrates the optical device 100 of FIG. 1 after the photonic crystal 102 has been rotated from a slightly counterclockwise angle to a slightly clockwise angle relative to the incident light beam 112 and, as shown, the steering angle $\theta_s$ swings dramatically such that the output beam 116 is instead provided at the second output waveguide 124. In accordance with an embodiment, the incidence angle $\theta_i$ is controllably varied by a relatively small amount using microelectromechanical systems (MEMS) actuation devices (not shown in FIGS. 1–2) to produce relatively large controlled variations in the steering angle $\theta_s$. Accordingly, the incident light beam 112 can be effectively steered among the spatially separated output waveguides 116 and 124 even where the longitudinal separation between the input waveguide 110 and the output waveguides 116/124 is relatively modest. Advantageously, the optical device 100 can thereby achieve functionalities such as optical switching and optical modulation while maintaining a modest longitudinal footprint.

From a frame of reference of the negatively refracting photonic crystal 102, the angle of incidence is $\theta_i$ and the angle of refraction is $(\theta_s - \theta_i)$. The incident light beam 112 and the deflected light beam 114 are on the same side of a normal to the photonic crystal intersecting the input waveguide 110. The ratio $(\theta_s - \theta_i)/\theta_i$ can be termed an angular amplification, and is brought about by what is generally termed the superprism effect. Depending on the particular frequencies, dimensions, and materials used, the superprism effect can result in very large angular amplifications.

For one embodiment in which the angular amplification is 10:1, the incidence angle $\theta_i$ is varied between +7 degrees and −7 degrees and the angle of refraction correspondingly varies between +70 degrees and −70 degrees, respectively, the steering angles $\theta_s$ thereby being +77 degrees and −77 degrees, respectively. For another embodiment in which the angular amplification is 25:1, the incidence angle $\theta_i$ is varied between +2 degrees and −2 degrees and the angle of refraction correspondingly varies between +50 degrees and −50 degrees, respectively, the steering angles $\theta_s$ thereby being +52 degrees and −52 degrees, respectively. Notably, for any particular photonic crystal and incident light frequency, the amount of angular amplification is dependent on the incidence angle $\theta_i$ itself in a manner that is not necessarily linear, i.e., the ratio $(\theta_s - \theta_i)/\theta_i$ will not necessarily be the same throughout the range of values of $\theta_i$. It is to be appreciated that, although the swings in the incident and steered angles in these examples is symmetric around zero degrees, the scope of the present teachings is not so limited and can include non-symmetric angles as well.

For the particular example of FIGS. 1–2, the optical device 100 forms a 1×2 optical switch. More generally, the number of output waveguides for each input waveguide can be different for different applications and, advantageously, can become relatively numerous while a modest overall longitudinal footprint is maintained. Because a particular output waveguide can capture increasing/decreasing amounts of deflected radiation for different steering angles therearound, the optical device 100 can also provide modulation functionality. One advantage of using MEMS-based actuation of the photonic crystal 102 is the wide range of switching/modulation rates achievable, ranging from quasi-static sub-Hertz rates all the way to the MHz range and, potentially, even up to the GHz range. Also, because it is physical movements based on physical dynamics that are used to modulate the direction of the light beam, many potentially unique modulation strategies are presented. Such modulation rates and/or modulation strategies might not be available for other types of superprismatic deflection control that vary one or more intrinsic properties of the photonic crystal materials.

Any of a variety of materials and material combinations can be used in the optical device 100 as could be readily identified by one skilled in the art in view of the present disclosure. In one example, a silicon-on-insulator (SOI) substrate is used, the photonic crystal 102 comprises an Si slab with air holes, and the input/output waveguides use an $Si/SiO_2$ material system. By way of example only and not by way of limitation, in one configuration suitable for a typical optical communications wavelength of 1550 nm, the photonic crystal 102 can comprise a 250 nm-thick Si slab with a triangular lattice pattern of 120-nm wide cylindrical air holes having a lattice constant of 420 nm.

For one embodiment, the photonic crystal 102 comprises dielectric materials that are not modulable. For another embodiment, the photonic crystal 102 comprises materials having modulable dielectric properties, such as lithium niobate, that are modulated in conjunction with the overall mechanical movements of the photonic crystal 102.

Figure 3A:
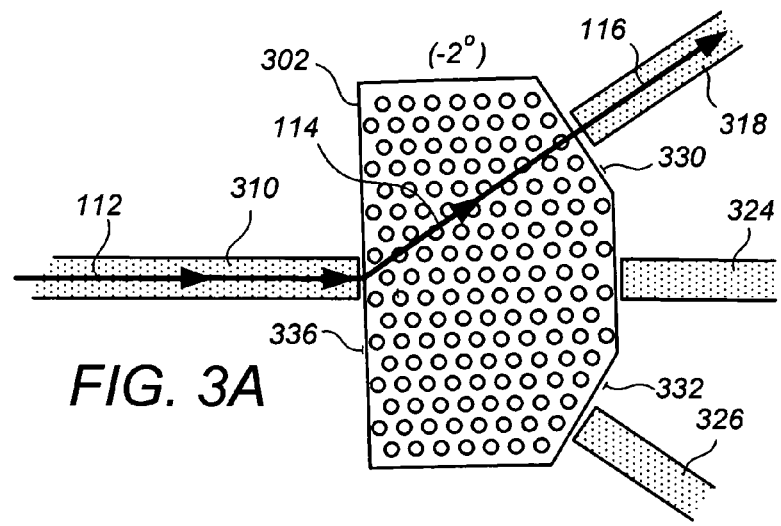
FIGS. 3A–3C illustrate a top view of an optical device according to an embodiment in first, second, and third configurations, respectively.
Figure 3B:
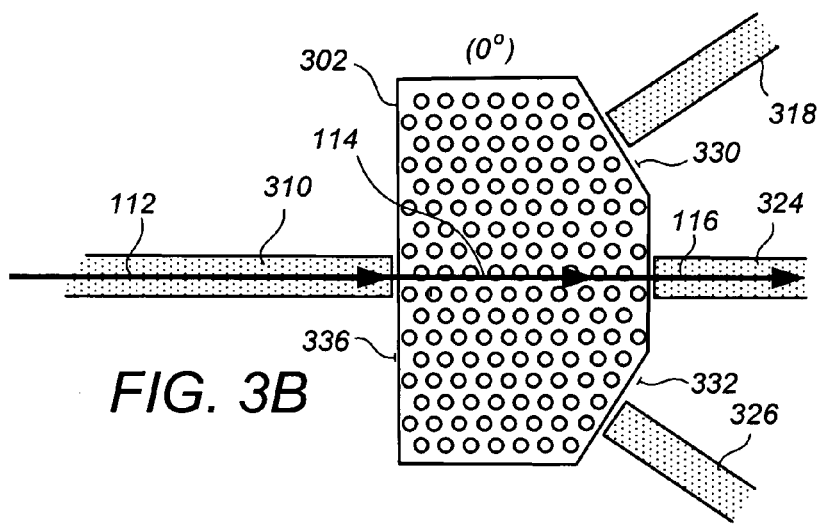
Figure 3C:
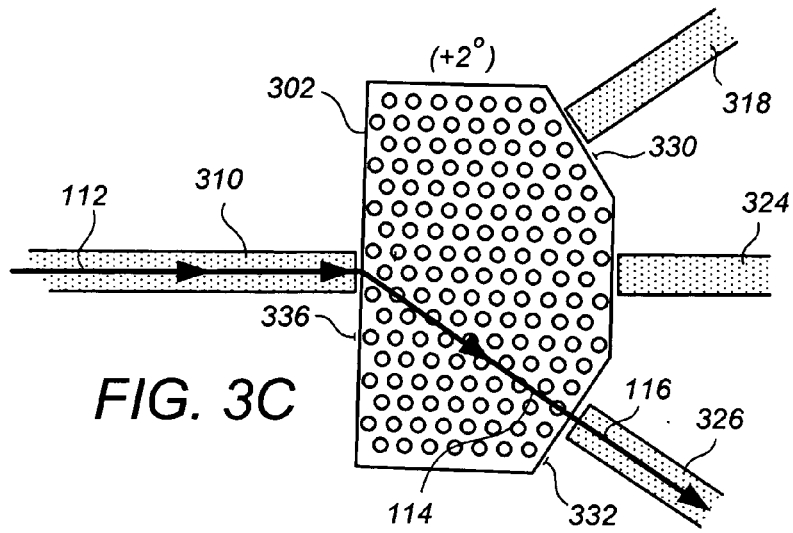

FIGS. 3A–3C illustrate top views of an optical device according to an embodiment in first, second, and third configurations, respectively, the optical device forming a 1×3 optical switch. An input waveguide 310 guides an incident beam 112 to a photonic crystal 302 having relatively small dynamically controlled incidence angle variations therewith that result in deflected light beams 114 having relatively large controlled steering angles. The deflected light beam 114 is respectively steered toward three output waveguides 318, 324, and 326 as shown. For the embodiment of FIGS. 3A–3C, the photonic crystal 302 includes two output surfaces 330 and 332 non-parallel to an input surface 336 and being angled such that each becomes parallel to an input surface of an active one of the receiving output waveguide 318 and 326, respectively. Accordingly, the output light beam 116 is collinear with the deflected light beam 114 for each switched position.

Figure 4A:
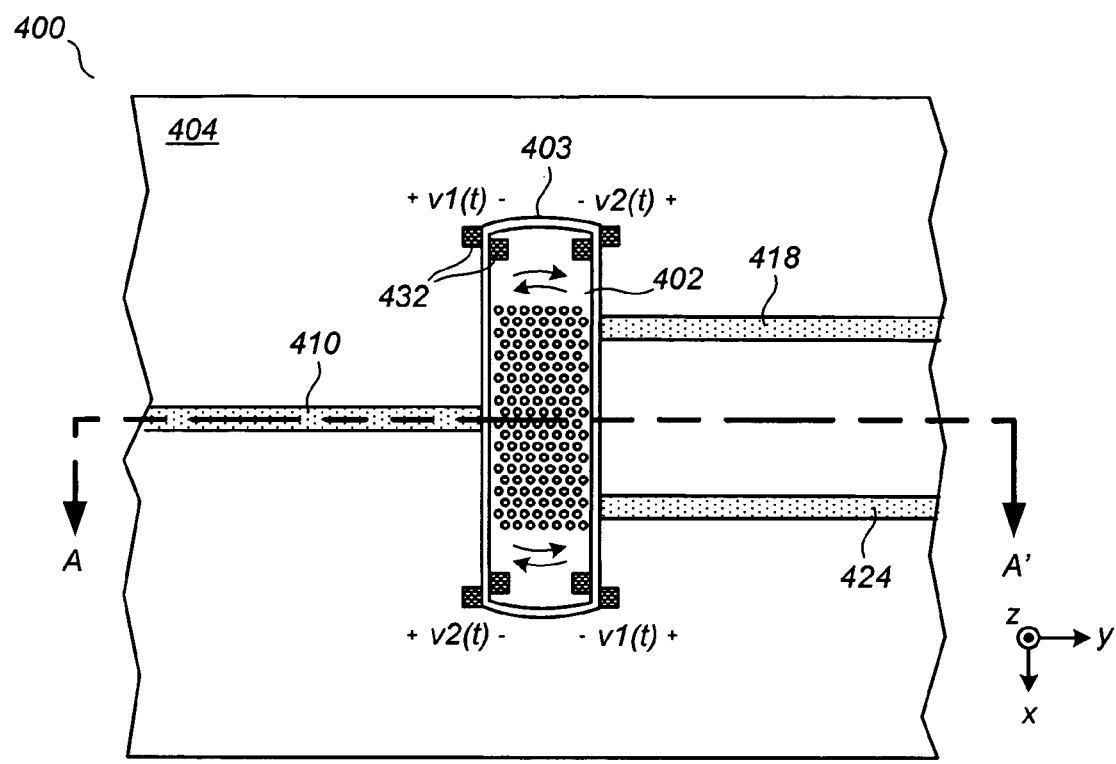
FIGS. 4A–4B illustrate a top view and a side cut-away view, respectively, of an optical device according to an embodiment.
Figure 4B:
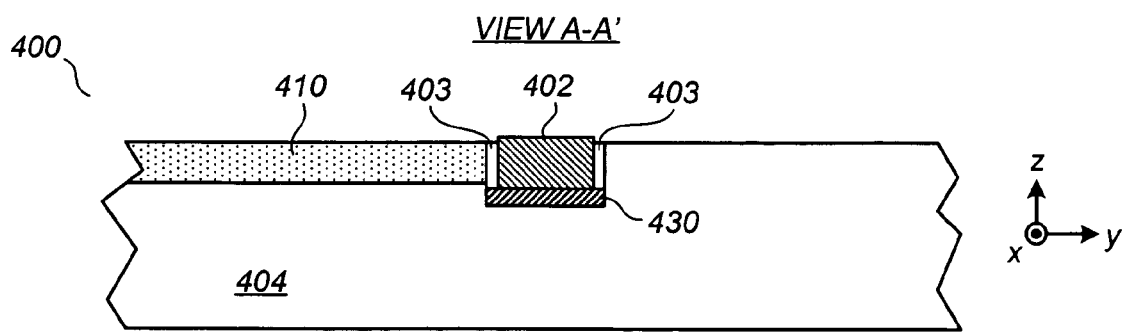

FIGS. 4A–4B illustrate a top view of an optical device 400 according to an embodiment and a side cutaway view A–A' thereof, respectively, the optical device 400 comprising a photonic crystal 402, a substrate 404, an input waveguide 410, and output waveguides 418 and 424. The photonic crystal 402 is floatably disposed atop a low-friction material 430, such as Teflon or a liquid, inside a recess 403. The angle of the photonic crystal 402 is electrostatically controlled by a MEMS actuation system comprising electrical contacts 432 as shown. Notably, although precise angular orientation of the photonic crystal 402 is desirable, the precision of the vertical position within the recess 403 can be relaxed because, advantageously, the photonic crystal 402 has no optical axis.

Figure 5:
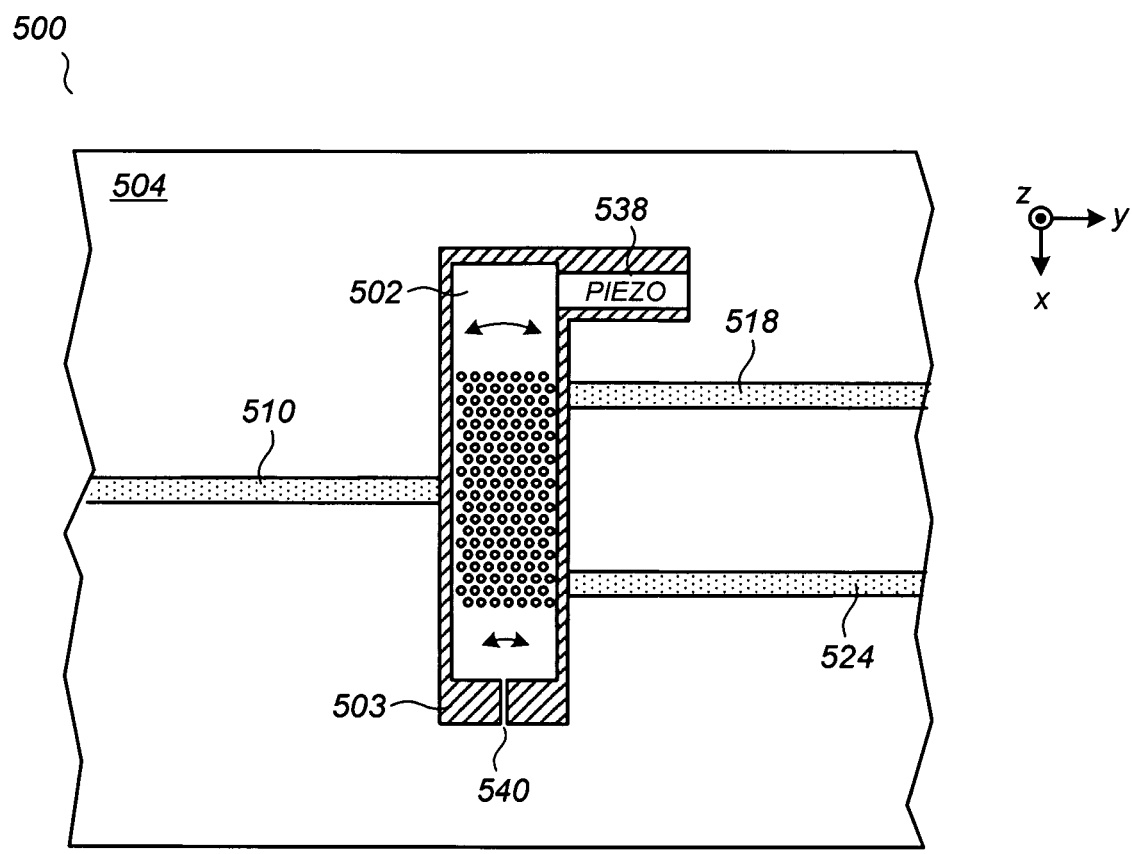
FIG. 5 illustrates a top view of an optical device according to an embodiment.

FIG. 5 illustrates a top view of an optical device 500 according to an embodiment, comprising a photonic crystal 502, a substrate 504, an input waveguide 510, and output waveguides 518 and 524. The photonic crystal 502 horizontally extends into a recess 503 from a bendable neck element 540, with an incidence angle between the input waveguide 510 and the photonic crystal 502 being varied by operation of a piezoelectric actuation element 538 as shown. In one embodiment, the piezoelectric element 538 controls the incidence angle at a rate of 1 MHz or greater. The photonic crystal 502 can horizontally extend in a cantilever-type fashion into the recess 503, or can alternatively be slidably supported by a low-friction surface at the bottom of the recess 503. In other embodiments, as opposed to using a bendable neck element, the photonic crystal 502 can be supported from underneath by a twistable vertical support element. Many other MEMS actuation schemes capable of achieving similar actuation of the photonic crystal 502 are within the scope of the present teachings.

Fabrication of optical devices according to one or more of the embodiments can be achieved using known integrated circuit fabrication methods including, but not limited to: deposition methods such as chemical vapor deposition (CVD), metal-organic CVD (MOCVD), plasma enhanced CVD (PECVD), chemical solution deposition (CSD), sol-gel based CSD, metal-organic decomposition (MOD), Langmuir-Blodgett (LB) techniques, thermal evaporation/molecular beam epitaxy (MBE), sputtering (DC, magnetron, RF), and pulsed laser deposition (PLD); lithographic methods such as optical lithography, extreme ultraviolet (EUV) lithography, x-ray lithography, electron beam lithography, focused ion beam (FIB) lithography, and nanoimprint lithography; removal methods such as wet etching (isotropic, anisotropic), dry etching, reactive ion etching (RIE), ion beam etching (IBE), reactive IBE (RIBE), chemical-assisted IBE (CAIBE), and chemical-mechanical polishing (CMP); modifying methods such as radiative treatment, thermal annealing, ion beam treatment, and mechanical modification; and assembly methods such as wafer bonding, surface mount, and other wiring and bonding methods.

Whereas many alterations and modifications of the embodiments will no doubt become apparent to a person of ordinary skill in the art after having read the foregoing description, it is to be understood that the particular embodiments shown and described by way of illustration are in no way intended to be considered limiting. By way of example, although propagation of optical signals (e.g., infrared, visible, ultraviolet) is one particularly useful application, it is to be appreciated that the scope of the present teachings is not limited to optical signals, but rather can include any type of electromagnetic radiation, ranging from radio frequency radiation and microwaves to x-ray radiation, that can be introduced into a photonic crystal and received or collected after propagating therethrough.

By way of further example, while one or more of the photonic crystals described supra is a "two-way" patterned device, e.g., comprising a first dielectric material patterned with a second dielectric material, it is to be appreciated that patterns of additional material may be included in the periodic arrays to form "three-way" photonic crystals, "four-way" photonic crystals, and so on, without departing from the scope of the present teachings. By way of still further example, although it is the photonic crystal that is mechanically actuated relative to a static input waveguide to control the incidence angle in one or more of the embodiments supra, in other embodiments it may be the input waveguide or other incident beam-providing element that is mechanically actuated relative to a static photonic crystal to control the incidence angle.

By way of still further example, while some embodiments supra are discussed in terms of two-dimensional photonic crystal slabs and planar lightwave circuits, the scope of the present teachings is not necessarily so limited. For example, the principles and advantages of the present teachings can be applied in the context of three-dimensional photonic crystals and associated three-dimensional switching or modulation circuits. Thus, reference to the details of the described embodiments are not intended to limit their scope.

What is claimed is:

1. A device for deflecting an incident radiation beam through a steering angle to produce a deflected radiation beam, comprising a photonic crystal receiving the incident radiation beam at a dynamically controlled incidence angle and being configured to negatively refract the incident radiation beam such that relatively large controlled variations of said steering angle are provided by relatively small controlled variations of said incidence angle, the device further comprising:
   a substrate;
   an input waveguide fixed relative to said substrate and guiding said incident radiation beam toward said photonic crystal;
   a microelectromechanical actuator coupled to said photonic crystal such that said photonic crystal is rotatable relative to said substrate; and
   a plurality of output waveguides fixed relative to said substrate and coupled to receive the deflected radiation beam for a corresponding predetermined plurality of said steering angles, respectively.

2. The device of claim 1, wherein said relatively large controlled variations of said steering angle are greater than about 10 (ten) times said relatively small controlled variations of said incidence angle.

3. The device of claim 2, wherein (a) said incidence angle is dynamically varied within a range of +/−2 degrees of a normal incidence angle at a frequency of 1 MHz or greater, and wherein said steering angle correspondingly varies within a range of about +/−52 degrees, or (b) said incidence angle is dynamically varied within a range of +/−7 degrees of a normal incidence angle at a frequency of 1 MHz or greater, and wherein said steering angle correspondingly varies within a range of about +/−17 degrees.

4. The device of claim 1, further comprising a plurality of output ports positioned to receive the deflected radiation beam for a respective plurality of steering angles, said device being operable as at least one of a switch and a modulator for the incident radiation beam.

5. The device of claim 4, wherein said photonic crystal comprises parallel surfaces receiving the incident radiation beam and providing the deflected radiation beam to said output ports, and wherein said output ports are oriented in a common direction substantially parallel to the incident radiation beam.

6. The device of claim 1, said microelectromechanical actuator comprising one of (i) an electrostatically actuated platform floatably maintained within a recess of the substrate, and (ii) a piezoelectrically actuated platform bendably or twistably coupled to said substrate.

7. A method for controlling an incident radiation beam, comprising:
   placing a photonic crystal in the path of the incident radiation beam, the photonic crystal being configured for negative refraction at a frequency of the incident radiation beam, the photonic crystal deflecting the incident radiation beam through a steering angle to produce a deflected radiation beam; and
   dynamically controlling an incidence angle between the incident radiation beam and the photonic crystal, wherein relatively large controlled variations of said steering angle are provided by relatively small controlled variations of said incidence angle, said incident radiation beam being guided toward said photonic crystal by an input waveguide formed on a substrate, wherein said dynamic controlling is provided by a microelectromechanical actuator coupled to said photonic crystal such that said photonic crystal is rotatable relative to said substrate.

8. The method of claim 7, wherein said relatively large controlled variations of said steering angle are greater than about 10 (ten) times said relatively small controlled variations of said incidence angle.

9. The method of claim 8, wherein (a) said incidence angle is dynamically varied within a range of +/−2 degrees of a normal incidence angle at a rate of 1 MHz or greater, and wherein said steering angle correspondingly varies within a range of about +/−52 degrees, or (b) said incidence angle is dynamically varied within a range of +/−7 degrees of a normal incidence angle at a rate of 1 MHz or greater, and wherein said steering angle correspondingly varies within a range of about +/−77 degrees.

10. The method of claim 7, further comprising dynamically controlling said incidence angle to steer the incident radiation beam toward at least one of a plurality of output ports positioned at a respective plurality of steering angles relative to the incident radiation beam to provide at least one of a switching and modulation functionality.

11. The method of claim 10, wherein said photonic crystal comprises parallel surfaces receiving the incident radiation beam and providing the deflected radiation beam to said output ports and wherein said output ports are oriented in a common direction substantially parallel to the incident radiation beam.

12. The method of claim 7, said microelectromechanical actuator comprising one of (i) an electrostatically actuated platform floatably maintained within a recess of the substrate and (ii) a piezoelectrically actuated platform bendably or twistably coupled to said substrate.

13. An apparatus for deflecting an incident radiation beam through a steering angle to produce a deflected radiation beam, comprising:
a photonic crystal receiving the incident radiation beam at an incidence angle and being configured for negative refraction at a frequency of the incident radiation beam; and
means for dynamically controlling said incidence angle;
wherein relatively large controlled variations of the steering angle are provided by relatively small controlled variations of said incidence angle, the apparatus further comprising:
a substrate;
input means fixed relative to said substrate for guiding said incident radiation beam toward said photonic crystal; and
a plurality of output means fixed relative to said substrate for receiving the deflected radiation beam for a corresponding predetermined plurality of said steering angles, respectively;
wherein said means for dynamically controlling comprises microelectromechanical actuation means coupled between said substrate and said photonic crystal to rotate said photonic crystal relative to said substrate.

14. The apparatus of claim 13, wherein said relatively large controlled variations of said steering angle are greater than about 10 (ten) times said relatively small controlled variations of said incidence angle.

15. The apparatus of claim 14, wherein (a) said incidence angle is dynamically varied within a range of +/−2 degrees of a normal incidence angle at a rate of 1 MHz or greater, and wherein said steering angle correspondingly varies within a range of about +/−52 degrees, or (b) said incidence angle is dynamically varied within a range of +/−7 degrees of a normal incidence angle at a rate of 1 MHz or greater, and wherein said steering angle correspondingly varies within a range of about +/−77 degrees.

16. The apparatus of claim 14, further comprising means for receiving the deflected radiation beam at a plurality of steering angles, said apparatus being operable as at least one of a switch and a modulator for said incident radiation.

17. The apparatus of claim 16, wherein said photonic crystal comprises parallel surfaces receiving the incident radiation beam and providing the deflected radiation beam to said means for receiving the deflected radiation beam.

18. The apparatus of claim 13, said microelectromechanical actuation means comprising one of electrostatic actuation means and piezoelectric actuation means.

* * * * *

UNITED STATES PATENT AND TRADEMARK OFFICE
CERTIFICATE OF CORRECTION

PATENT NO.         : 7,187,491 B2
APPLICATION NO. : 11/339144
DATED                  : March 6, 2007
INVENTOR(S)        : Alexandre Bratkovski It is certified that error appears in the above-identified patent and that said Letters Patent is hereby corrected as shown below:

In column 7, line 19, in Claim 11, before "and" delete "ports" and insert -- ports, --, therefor.

In column 7, lines 24-25, in Claim 12, delete "substrate" and insert -- substrate, --, therefor.

Signed and Sealed this

Sixth Day of October, 2009

David J. Kappos
*Director of the United States Patent and Trademark Office*